(12) United States Patent
Geier et al.

(10) Patent No.: US 11,684,462 B2
(45) Date of Patent: Jun. 27, 2023

(54) DENTAL PROSTHESIS

(71) Applicant: Ivoclar Vivadent AG, Schaan (LI)

(72) Inventors: Markus Geier, Tisens (IT); Frank Frenzel, Balgach (CH); Thomas Baaske, Mols (CH); Roger Frei, Heerbrugg (CH)

(73) Assignee: Ivoclar Vivadent AG, Schaan (LI)

( * ) Notice: Subject to any disclaimer, the term of this patent is extended or adjusted under 35 U.S.C. 154(b) by 977 days.

(21) Appl. No.: 16/512,048

(22) Filed: Jul. 15, 2019

(65) Prior Publication Data

US 2020/0015944 A1 Jan. 16, 2020

(30) Foreign Application Priority Data

Jul. 16, 2018 (EP) .................... 18183662

(51) Int. Cl.
*A61C 13/00* (2006.01)
*A61C 8/00* (2006.01)
*A61C 13/271* (2006.01)

(52) U.S. Cl.
CPC ...... *A61C 13/0004* (2013.01); *A61C 13/0006* (2013.01); *A61C 13/0022* (2013.01); *A61C 8/0012* (2013.01); *A61C 8/0089* (2013.01); *A61C 13/26* (2013.01); *Y10T 428/216* (2015.01)

(58) Field of Classification Search
None
See application file for complete search history.

(56) References Cited

U.S. PATENT DOCUMENTS

| 4,970,032 A | 11/1990 | Rotsaert | |
|---|---|---|---|
| 2010/0015573 A1* | 1/2010 | Holzner | A61K 6/822 433/201.1 |
| 2018/0071063 A1* | 3/2018 | Watzke | A61C 13/00 |

FOREIGN PATENT DOCUMENTS

WO 9107141 A1 5/1991

* cited by examiner

*Primary Examiner* — Elizabeth Collister
(74) *Attorney, Agent, or Firm* — Ann M. Knab; Thad McMurray (57) ABSTRACT

A dental prosthesis is provided, manufactured from a one-piece or multi-piece prosthesis blank which is composed of a gum-colored material (14) and a tooth-colored material (14), especially each one being based on plastic material. The tooth-colored material (14) of the blank (10) has a diameter or a width of more than 5 cm and especially a substantially flat cylindrical shape with a diameter/height ratio of more than 2:1, preferably more than 3:1. The gum-colored and tooth-colored materials (14, 12) are bonded together by bonding, polymerization and/or integral production. The boundary (16) between the materials, as viewed in the direction of the dental arch course, is wave-shaped with alternating grooves and ribs (22, 24), and in the region of the anterior arch in the vestibular direction—is of radiant shape.

23 Claims, 5 Drawing Sheets

DENTAL PROSTHESIS

CROSS-REFERENCE TO RELATED APPLICATIONS

This application claims priority to European Patent Application No. 18183662.8 filed on Jul. 16, 2018, the disclosure of which is incorporated herein by reference in its entirety.

TECHNICAL FIELD

The invention relates to a dental prosthesis.

BACKGROUND OF THE INVENTION

It has been known for long to fabricate dentures from tooth-colored material and gum-colored material and to mill the dentures such that the dental arch is created from the tooth-colored material and the denture base is created from the gum-colored material.

Typically, PMMA-based plastics are used for the two materials, wherein said two materials can easily be attached to each other, for example by gluing or polymerizing.

The tooth-colored material can also be produced in the form of a complete dental arch, i.e. such that the individual cells are connected to each other at least by narrow bars and the dental arch therefore is of integral shape.

For the attachment of the dental arch to the denture base, it is known to provide a type of U-shaped channel into which the dental arch is glued.

Depending on the size of the desired dental arch, the canal had to be provided in different places.

In order to achieve an aesthetically satisfactory result despite the use of such a canal, the gingival line is milled in the gum-colored material as a chain line. This is quite complicated because the line must match the dental arch to be produced.

Examples of this approach are the solutions known from WO 90/13268 A1 and corresponding U.S. Pat. No. 4,970,032, which is hereby incorporated by reference and WO 91/07141 A1.

Based on these rather old solutions, multilayer plastic elements have been proposed recently in connection with the use of CAD/CAM technology, which are for the production of teeth and prostheses to provide the teeth and the prosthesis base to provide a final prosthesis. Due to the different requirements of the different materials, i.e. the gum-colored denture base material on the one hand and the tooth-colored denture material on the other hand, this solution has not yet been accepted, even though it has already become otherwise known to manufacture both teeth and a denture base from PMMA.

Furthermore, rapid prototyping methods have recently been proposed for providing both teeth and prosthesis bases made of plastic material or other materials if necessary. This development, too, has not yet made any real progress.

On the other hand, in view of increasing life expectancy, there is an increasing demand for full and partial prostheses, whereby, for the sake of simplicity, both full and partial prostheses are considered under the term prostheses. This increasing demand is paired with a likewise increasing cost constraint, even as a result of the expected considerable increase in demand.

From EP 3 064 170 A1 and corresponding US 2018071063, which is hereby incorporated by reference, it is known to create the boundary between the materials as a radiant waveform. The waveform can then immediately represent the chain line of the gingival margin.

The advantage of this embodiment resides in that the gingival margin is always generated automatically, regardless of the size of the required tooth arch, so that possible errors are automatically avoided.

Due to increase of cost, it is often desirable to produce dental prostheses using milling machines that can be obtained at low cost. Such milling machines have a repeatability of e.g. 0.5 mm, even if they are proprietarily said to have 0.1 mm or even 0.05 mm of repeatability. In addition, such milling machines are often only 4-axis machines, so that creation of undercuts especially causes problems.

On the other hand, strong undercuts are required in the edentulous anterior region, i.e. in the anterior region, due to tooth loss.

Moreover, with the known solutions, use of very long milling tools is required. In the case of long milling tools, lower accuracy inevitably results, on the one hand, due to the flexibility of a thin and slim milling tool, especially at different advance speeds, and on the other hand due to vibrations which may occur during the milling process.

SUMMARY OF THE INVENTION

Contrary to this, the object of the invention is to provide a dental prosthesis according to the claims, which, when using comparatively inexpensive milling machines, nevertheless enables a prosthesis to be accurately and aesthetically advantageously manufactured.

According to the invention, this object will be solved by the claims. Advantageous further embodiments will arise from the subclaims.

According to the invention, a blank is to be formed from tooth-colored and gum-colored material comprising a boundary, which boundary is provided as a wave line. The wave line can be a chain line similar to the gingival margin and is realized across the entire dental arch.

The wave line is of radiant shape at least in the anterior region, i.e., it forms wave troughs and wave crests—grooves and ribs—starting from the center of the radius and extending in the radial direction.

According to the invention, the boundary surface is formed in a specific manner. It undulatingly rises according to the wave line, with an average inclination of 15 degrees or more, such that the tooth-colored material distally is at a greater height than in the mesial direction.

As a result, the boundary is undulatingly inclined, and is also inclined in relation to the subsequent occlusal plane. It is also intended for the posteriors to have a greater height than the anteriors. This is expressed in that a corresponding height of the tooth-colored material is provided.

Therefore, the tooth-colored material distally is at a greater height than mesially.

Herein, the height refers to the height present in the blank. This can be a flat disc with an essentially circular cross-section. The outer surface, i.e. the circumferential surface of the blank, may significantly deviate from the cylindrical shape, as described in detail below.

According to the invention, it is intended that the anteriors are comparatively close to the adjacent upper side of the blank with their boundary surface. This allows working with comparatively short milling tools, especially in the anterior region. This enables low-vibration and accurate production independent of advance rate.

Furthermore, the close proximity to the upper side of the blank allows milling of undercuts as is often required in edentulous patients, i.e., when fabricating full dentures.

According to the invention, it is advantageous that a comparatively flat prosthesis be fabricated with correspondingly low material costs. The prosthesis to be realized according to the inventive solutions typically has greater tooth height than it is common in the molar region. On the one hand, this is mechanically advantageous, as the larger and bulky molars allow large chewing forces to be better distributed across the denture. On the other hand, the height of the molars, even when the mouth is open, is typically not or only slightly noticeable, so that this is aesthetically uncritical, especially in the upper jaw, even if a human natural dental arch typically does not have such a shape.

According to the invention, the tooth-colored material has greater height in the gingival occlusal direction in the molar region than in the anterior region. The anterior tooth height is chosen rather narrowly—but such that even the largest anterior teeth required just fit into the tooth-colored material.

Towards and beyond the canine teeth, the height of the tooth material increases. This also makes it possible to elegantly take into account the fact that human canines often have the largest exposed length; according to the invention, even their area is higher than the front tooth area due to the rising crest line.

According to the invention, it is particularly favorable that with a larger inclination of the interface being available, a considerably larger proportion of patients can be treated. With an inclination of 20 to 25%, the proportion is 80% instead of the usual 60%.

Another advantage resides in that the blank can have a lower height than before. This can be between 10-50 mm, or 15-40 mm or 25-35 mm or 34-40 mm, for example.

The amount of PMMA material required, which is quite expensive in terms of dental quality, can significantly be reduced in accordance with the invention, and due to the lower disc height, the milling time required to fabricate the finished prosthesis is also shorter.

The invention is not limited to realization of a full prosthesis. Instead, the term "prosthesis" also includes a partial denture and the term "dental arch" also includes a partial dental arch.

As far as the dental arch is called U-shaped, it is intended to accordingly include partly U-shaped.

Moreover, the invention is not limited to the upper jaw or the lower jaw; instead, the inventive idea can be realized with both an upper jaw prosthesis and a lower jaw prosthesis.

The tooth-colored material can be realized in an arched form in the blank, in the form of a broad-legged U or in the form of a disc. In the first case, the width of the U's covers the area in which teeth can be produced depending on the size of the desired dental arch, wherein herein, this area is referred to as the shaping area.

The gum-colored material extends such that it fills the disc shape of the blank up to the bottom side of the blank.

The disc shape of the blank can also be realized at an angle. In this case, the milling blank can be produced even flatter, thus reducing even further the height of the tooth-colored material in the area of the molar by the inclination.

In this embodiment, a clamping edge of the blank obliquely extends to the top and bottom of the blank. In this case, the inclination of the boundary surface, as provided according to the invention, refers to the surface clamped by the clamping edge.

With this embodiment, the inclination of the top and bottom sides of the blank in relation to the clamping edge in any case is less than the inclination of the boundary surface in relation to the clamping edge. It can be 8 or 10 degrees, for example.

With this embodiment, undercuts are even more accessible, so that up to 90% of the patients can be treated.

In another advantageous embodiment of the invention, it is provided to implement an anti-twist device both above and below the clamping edge.

In particular, it is intended to implement a classical anti-twist device including asymmetrically distributed grooves on one side, e.g. the white side or top side of the blank, and on the opposite side, i.e. below the clamping edge, a device including asymmetrically distributed flattened areas for other workpiece holders for more recent-type milling machines.

In an advantageous embodiment, an additional layer of a material having different refractive properties, especially due to the different refractive indices of this material compared to the gum-colored and the tooth-colored material, is arranged between the tooth-colored and the gum-colored material.

These properties are promoted by the presence of organic and/or inorganic components which alter the transparency or opacity of the layer. They preferably are polymerizable by free radicals, especially thermally or light-initiated, and are thermoplastically processed together with the materials and inserted between the materials.

This creates an opaque layer, in particular an organic opaque layer, preferably a light-curing opaque layer, on the interface between the materials. This prevents the gum color of the base material from appearing in the lighter tooth material, thus falsifying the natural appearance. Any greyish gingival margin will be suppressed and the chroma of the gingival or tooth-colored material is not adversely affected.

BRIEF DESCRIPTION OF THE DRAWINGS

Further advantages, details and features will arise from the following description of several examples of the invention, making reference to the drawings, wherein.

DETAILED DESCRIPTION

A blank 10 will be represented, which consists of a tooth-colored material 12 and a gum-colored material 14. It is provided for the manufacture of a mandibular dental prosthesis.

Figure 1:
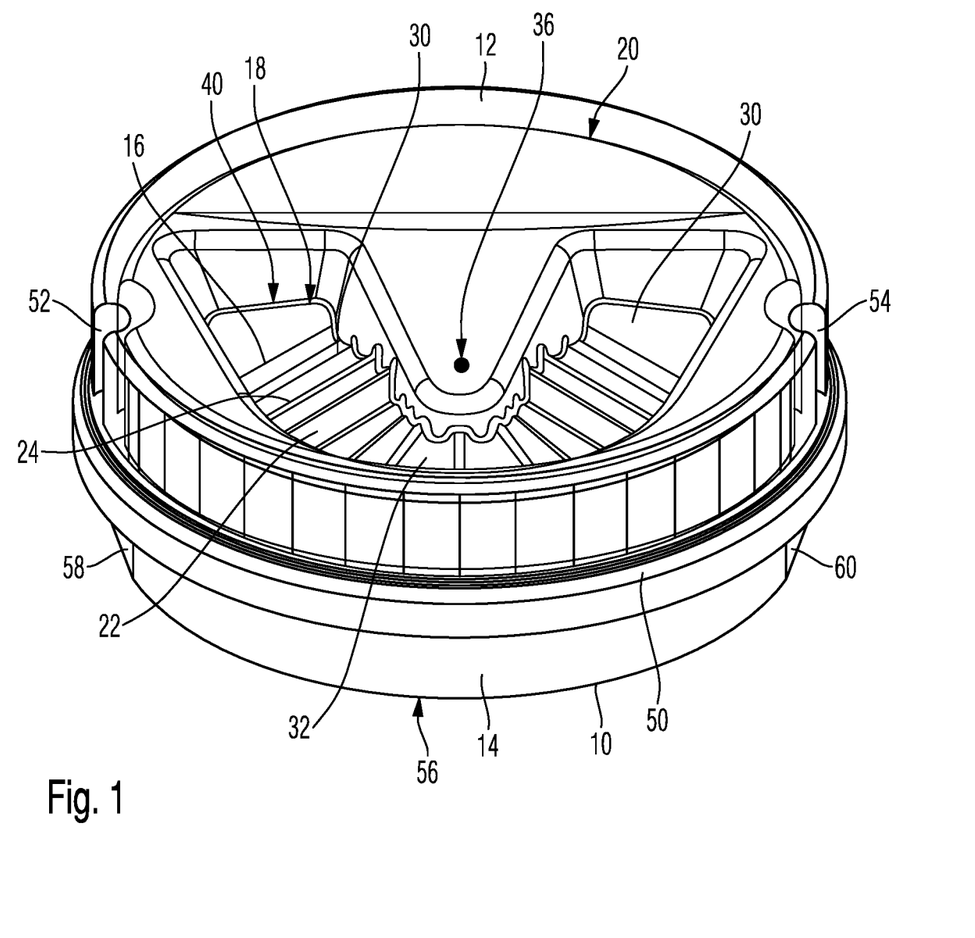
FIG. 1 is a schematic section through an embodiment of a blank for a dental prosthesis according to the invention.

The blank 10 essentially is disc-shaped. A boundary 16 between the tooth-colored material 12 and the gum-colored material 14 is shown in FIG. 1. It has a specifically shaped recess 18 in the gum-colored material 14. Starting from the upper side 20 of the blank 10, the material 12 extends into the recess 18.

The tooth-colored material 12 of the blank 10 has a diameter or width of more than 5 cm and especially a substantially flat cylindrical shape having a diameter/height ratio of more than 2 to 1, preferably more than 3 to 1.

The gum-colored and the tooth-colored material 14 and 12 are bonded together, e.g., by bonding, polymerization and/or by integrally manufacturing.

The recess essentially is in the form of a U with quite wide legs, i.e. a dental arch. The boundary 16 is formed therein in a designated way. It has a wave form across the course of the U, corresponding to a gingival margin, i.e., essentially corresponding to a chain line.

The waveform alternates between wave troughs 22 and wave crests 24. The wave troughs are also grooves, and the wave crests are ribs.

Figure 2:
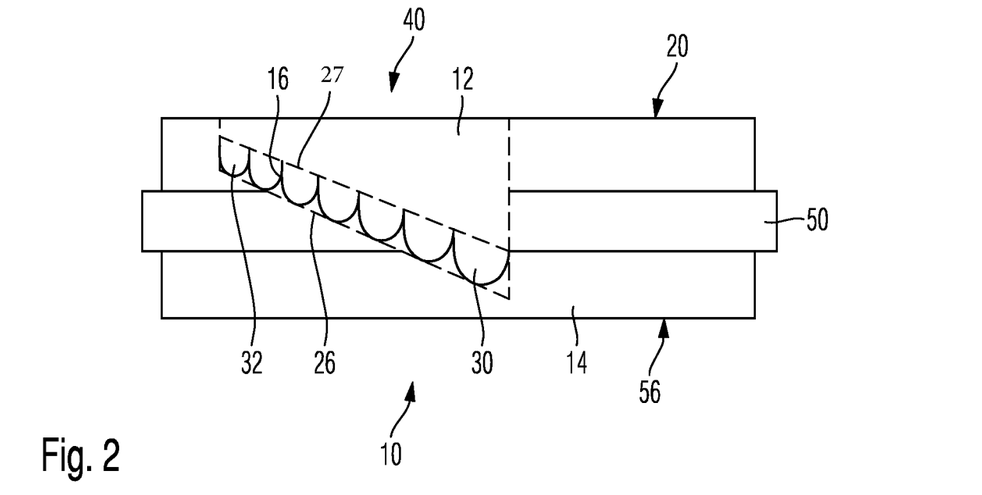
FIG. 2 is a corresponding section through another embodiment.

The peaks of the wave crests 24 and also the peaks of the wave troughs 22, which face downwards, each form a crest line, wherein the lower crest line 26 and upper crest line 27 are shown in FIG. 2.

The crest lines extend from distal 30 to mesial 32. The boundary 16 thus is located diagonally in the blank 10 being higher at the front, i.e., in the area of the anteriors, than at the back.

This applies to the average course of the boundary 16, which actually is undulated as described above.

Herein, the angle of inclination or the inclination of the boundary 16 is 16 degrees on average.

In the area of the anterior teeth or anteriors, the wave crests and wave troughs 24 and 22 are radiating from oral or lingual to vestibular. They radially extend outwards from a radiancy center 36.

On the other hand, they extend parallel to each other in the molar and premolar region. The leg width of the U and thus the width of the recess 18 is considerably more than it is required for shaping teeth. The blank 10 is designed to be able to realize both large and small dental arches by milling teeth radially inwards, radially in the middle or radially outwards in relation to the center 36.

In this respect, reference is made to the aforementioned European patent application EP 3 064 170 A1 and corresponding US 2018071063 which is fully incorporated by reference.

In this respect, the entire width of the U is available as shaping area 40 for shaping.

As can be seen from FIG. 1, the recess 18 is significantly deeper in the distal area 30 than in the mesial area 32. This results in a significantly greater height of the tooth-colored material 12 in the distal direction than in the medial direction. As a result, the anterior region located in the mesial area 32 closely approaches the upper side 20 of the blank 10, and any undercuts required therein can rapidly and precisely be milled with short milling cutters.

FIG. 1 also shows that the blank 10 has a circumferential clamping edge 50. The clamping edge 50 has the typical shape for dental disc blanks, and the disc-shaped blank 10 has a diameter of between 25-120 mm or 35-110 mm or 50-105 mm or 70-100 mm or 95-100 mm.

Above the clamping edge 50, tooth-colored material 12 extends backwards in a recessed manner. Grooves 52 and 54 are provided therein, which may be arranged symmetrically or asymmetrically to each other, preferably, they are arranged asymmetrically to each other, i.e. not diametrically opposite to each other, serving as anti-rotation devices.

Additional flattened areas 58 and 59 are formed on the bottom side 56 of the blank 10. They are provided in the area of the material 14 and may be symmetrical or asymmetrical to each other, preferably being asymmetrical to each other. They are used for alternative clamping in more recent milling machines to prevent rotation.

According to FIG. 2, the boundary 16 extends while rising from distal 30 to mesial 32, in this embodiment, it rises at an angle of 22 degrees. The angle can range from 1 to 50 degrees, preferably 5 to 30 degrees, 10 to 27 degrees, and more preferably 15 to 25 degrees.

The occlusal plane is provided slightly below the upper side 20, e.g. 1 mm below it, but can range from 0.2 to 5 mm, or 0.5 to 4 mm, or 0.75 to 3 mm.

Herein, the boundary 16 extends in a straight line, i.e. according to FIG. 2, and having constant inclination. Alternatively, it is also possible to provide it with a curved or, for example, an S-shaped course.

Figure 3:
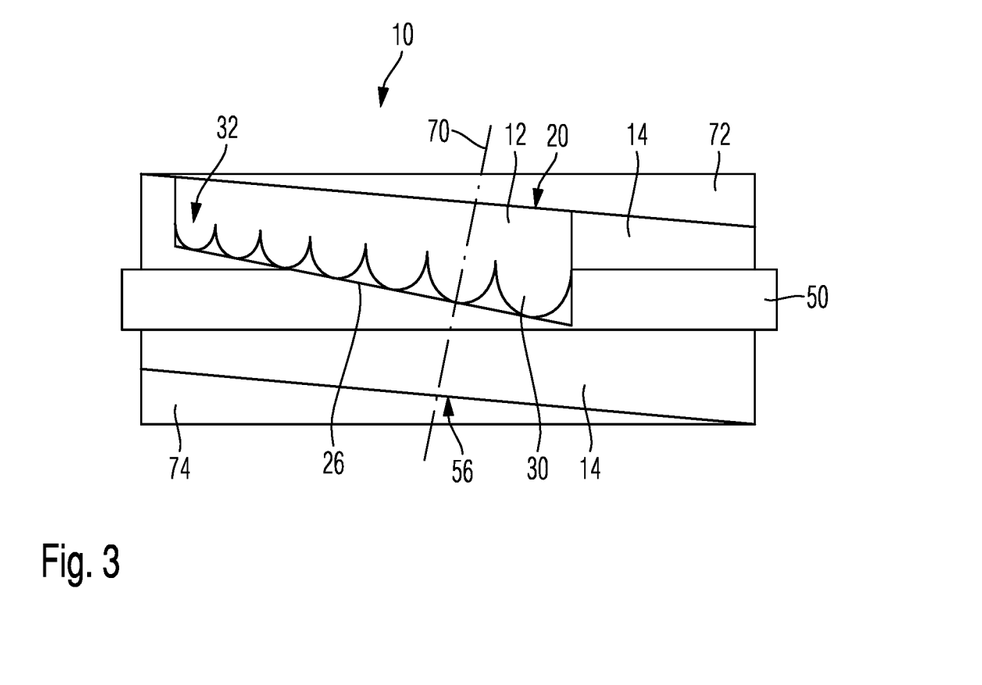
FIG. 3 is a perspective view of another embodiment of a blank for the manufacture of a dental prosthesis according to the invention.

In the embodiment according to FIGS. 2 and 3, only the area of the recesses 18 (shown in FIG. 1), i.e., the shaping area 40, is filled with white, i.e., tooth-colored material 12. The rest of the blank 10 consists of gum-colored material 14.

Herein, the boundary surface 16 and the crest line 26 extend at an angle of 15° in FIG. 3 in relation to the surface which is clamped by the clamping edge 50.

Accordingly, the part of the blank occupied by material 12 and 14 to be milled away in FIG. 3 is considerably smaller. This is symbolized by the triangles 72 and 74. The blank disc 10 can be flatter, i.e., less high, than in the embodiment according to FIG. 2.

Herein, the blank 10 also has a circular disc shape. It comprises a disc axis 70 and a clamping edge 50 inclined against the disc axis 70, said inclination increasing the rise of the boundary 16 and the inclination of the crest line 26.

Figure 4:
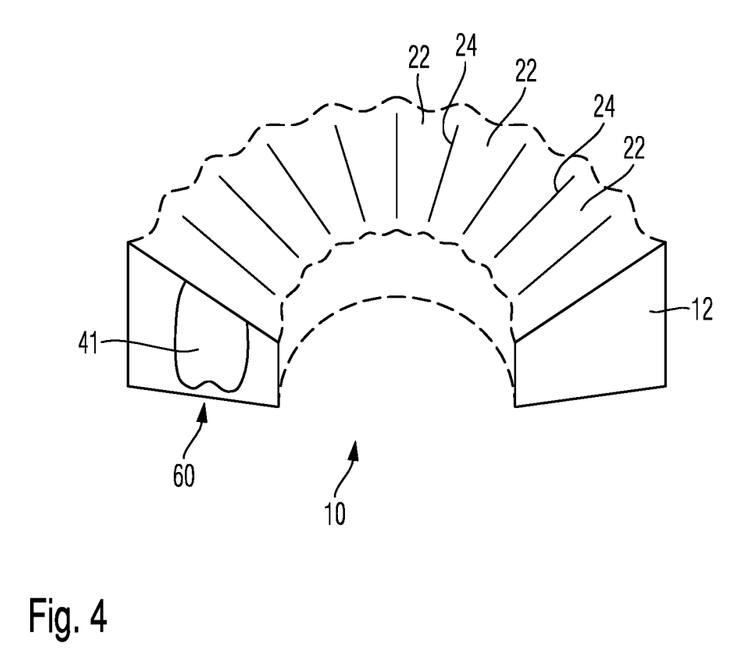
FIG. 4 is a schematic perspective view of another embodiment of a prosthesis blank according to the invention.

FIG. 4 shows another embodiment of a blank 10. Only the tooth-colored material 12 of the blank is shown, while the remaining parts extend and are formed according to FIG. 3, for example.

The occlusal plane 60 extends on the side shown below in FIG. 3. Accordingly, a tooth 41 in FIG. 4 is drawn into the material 12 such that its occlusal side faces the occlusal plane 60.

In contrast to the embodiments shown in FIGS. 1 to 3, in FIG. 4 the crests, i.e., the ribs 24, are inclined in the vestibular-oral or vestibular-lingual direction, while in FIG. 3, for example, they extend in a straight line, i.e. parallel to the occlusal plane.

Orally, the ribs are 24 closer to occlusal than vestibular.

The angle between the occlusal plane 60 and the rib 24 may broadly be adapted to the requirements in a wide range. For example, the angle can be 10 to 20 degrees, but can also be higher.

The angle can also be different for the individual teeth or interdental spaces.

The crests 24 correspond to the interdental spaces and the troughs 22 correspond to the teeth.

The inclination shown in FIG. 4 refers both to the crests 24 and to the troughs 22.

It has been shown that the inclination provided for in this respect allows better adjustment, especially with large differences being present between dental arches.

Figure 5:
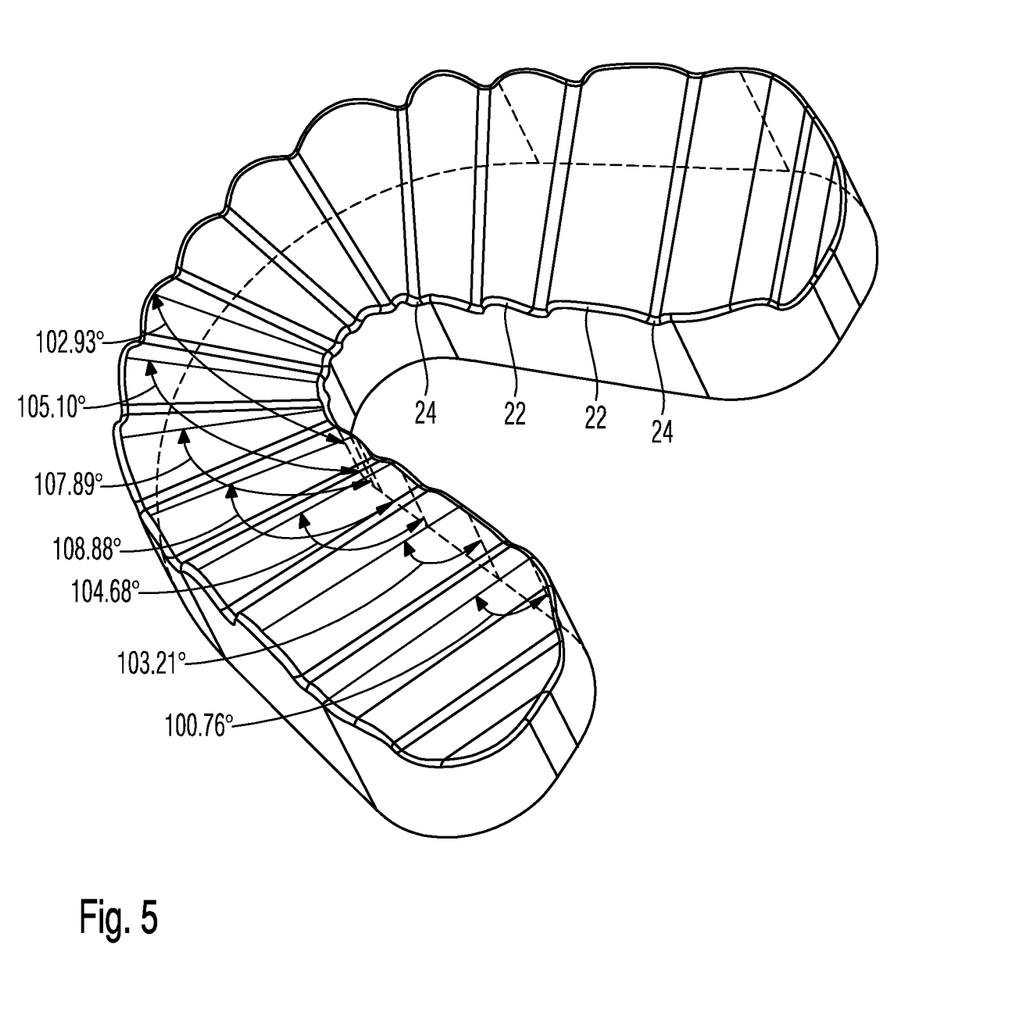
FIG. 5 is a schematic perspective view of another embodiment of a prosthesis blank according to the invention.
Figure 6:
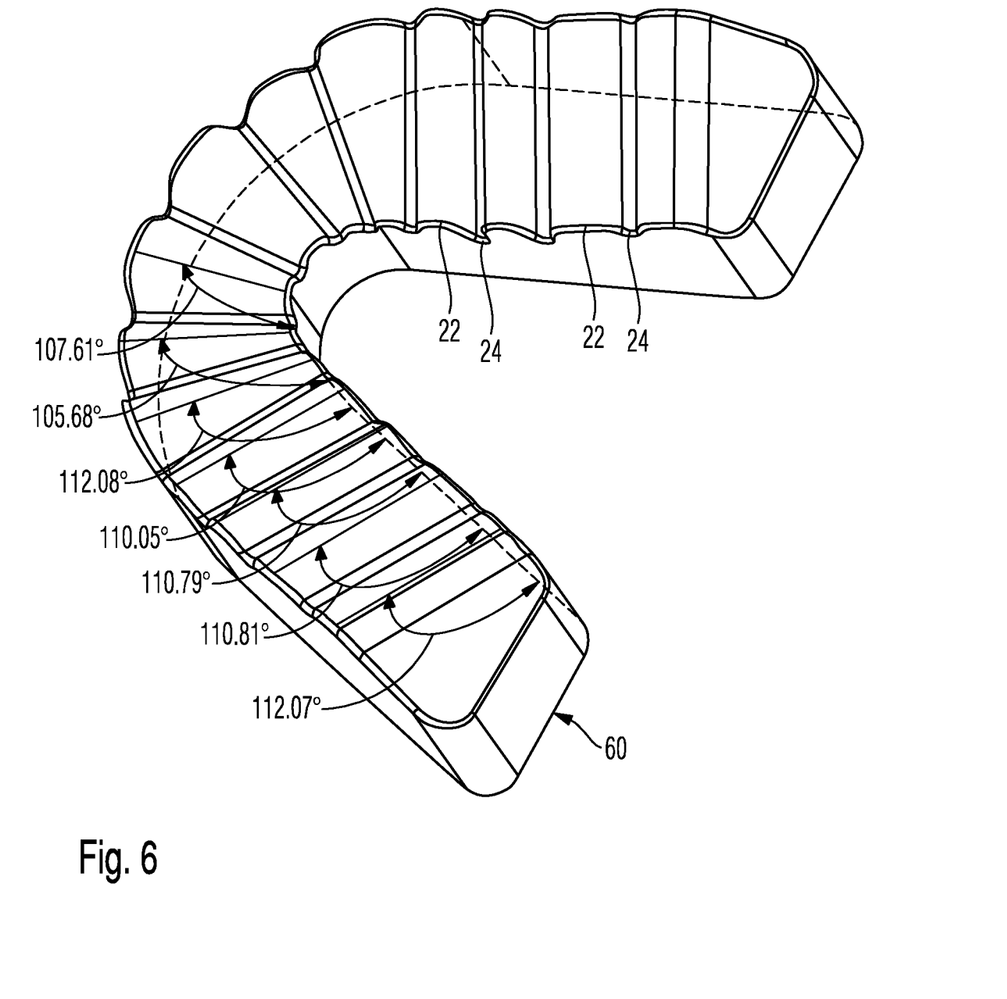
FIG. 6 is a schematic perspective view of another embodiment of a prosthesis blank according to the invention.

Exemplary angles of inclination of the crests 24 are shown in FIG. 5 for the lower jaw and in FIG. 6 for the upper jaw. The angles of inclination indicated therein refer to a normal to the blank, which blank is formed in a disc-shaped manner.

In relation to the occlusal plane 60, the angles for the mandible according to FIG. 5 are between 10 degrees and 19 degrees and for the maxilla between 15 degrees and 23 degrees.

It is to be understood that adjustments of the angle and also of the course of the crest line across the dental arch are possible in wide range depending on the requirements.

What is claimed is:

1. A single-part or multi-part dental prosthesis blank, said blank comprising
   a gum-colored material (14) and a tooth-colored material (12),
   wherein an occlusion plane extends at a side of the tooth-colored material opposite to the gum-colored material, which gum-colored and tooth-colored materials (12, 14) are bonded together by adhesion, polymerization, injection molding and/or by integrally producing,
   wherein a boundary (16) between the gum-colored and tooth-colored materials, as viewed following a course of a dental arch, are wave-shaped with alternating grooves and ribs (22, 24) forming troughs and crests, and are radially formed in an anterior region of the dental arch, as viewed in an oral vestibular direction,
   wherein the boundary (16) between the tooth-colored and the gum-colored material (12, 14) as viewed from a distal to mesial direction across the course of the dental arch rises in waves towards an occlusal plane, with an average inclination of 15 degrees or more, and
   wherein the tooth-colored material (12), in a molar region (30), has a greater height in the gingival-occlusal direction than in an anterior tooth region (32).

2. The dental prosthesis blank according to claim 1, wherein the wave crests (24) form a crest line (26) across the course of the dental arch, the crest line being inclined towards the occlusal plane and towards the side of the blank (10) adjacent to the tooth region.

3. The dental prosthesis blank according to claim 2, wherein the blank (10) is circular disc-shaped and/or has a clamping edge (50) inclined against the disc axis, and wherein the boundary (16) and crest line (26) increasingly incline.

4. The dental prosthesis blank according to claim 3, wherein the incline of the boundary (16) and the crest line (26) is at an angle of 1 to 10 degrees.

5. The dental prosthesis blank according to claim 4, wherein the angle of inclination of the boundary (16) and the crest line (26) is about 5 degrees.

6. The dental prosthesis blank according to claim 1, wherein a crest line of each crest (24) or at least part of the crests (24), as viewed from the oral vestibular direction, extends in an inclined manner, at an angle of 10 to 40 degrees, either straight or curved or following the Curve of Spee.

7. The dental prosthesis blank according to claim 6, wherein the angle of inclination is between 15 and 25 degrees.

8. The dental prosthesis blank according to claim 1, wherein the width of the troughs (22) is adapted to the width of a tooth to be produced and a trough for a first molar has the largest trough width.

9. The dental prosthesis blank according to claim 1, wherein the crests (24) and troughs (22) have the same shape or at least remain congruent over a shaping region (40) extending from a lingual to vestibular direction.

10. The dental prosthesis blank according to claim 1, wherein a substantially horseshoe-shaped, semicircular or U-shaped shaping region (40) is provided within the blank (10), wherein the shaping region has an undulating boundary (16) between the tooth-colored and the gum-colored material.

11. The dental prosthesis blank according to claim 10, wherein the tooth-colored material (12) extends from the boundary (16) to the occlusal plane, and the gum-colored material extends outside the shaping region (40) to the occlusal plane.

12. The dental prosthesis blank according to claim 10, wherein the tooth-colored material (12) extends from the boundary (16) to the occlusal plane or beyond it, and also extends outside the shaping region (40).

13. The dental prosthesis blank according to claim 1, wherein in the molar region (30), and in a premolar region, the ribs (24) corresponding to interdental spaces formed by the boundary surface (16) extend parallel to each other in the oral-vestibular direction, as viewed in the oral direction.

14. The dental prosthesis blank according to claim 1, wherein in the anterior tooth region (32), to produce a radiate course, the ribs (24), which are formed by the boundary (16) and correspond to interdental spaces, diverge from the oral vestibular direction.

15. The dental prosthesis blank according to claim 1, wherein the crests (24) incline from the vestibular to oral direction, approximately to the occlusion plane (60), at an angle of 10 to 40 degrees.

16. The dental prosthesis blank according to claim 15, wherein the angle of inclination of the crests (24) is between 15 and 25 degrees.

17. The dental prosthesis blank according to claim 1, wherein an additional layer of a material having different refractive properties due to different refractive indices compared to the gum-colored and the tooth-colored materials (14, 12), is arranged between the tooth-colored and the gum-colored material.

18. The dental prosthesis blank according to claim 1, wherein the blank has a radially outwardly projecting rib (50) radially on the outside, wherein the rib is arranged centrally with respect to the height of the blank (10).

19. The dental prosthesis blank according to claim 1, wherein a clamping edge (50) with a radially outwardly projecting clamping rib is formed on the outer circumference of the blank (10), and
   wherein a first positioning element is provided on one side of the clamping rib of the blank, and on the other side of the clamping rib of the blank, a second positioning element is provided.

20. The dental prosthesis blank according to claim 19, wherein the first positioning element comprises a first anti-rotation device with asymmetrically distributed anti-rotation grooves (52, 54), and,
   wherein the second positioning element comprises a second anti-rotation device (58, 60) with asymmetrically distributed anti-rotation surfaces.

21. The dental prosthesis blank according to claim 1, wherein the tooth-colored material (12) of the blank (10) has a diameter or a width of more than 5 cm and a substantially flat cylindrical shape with a diameter/height ratio of more than 2 to 1.

22. The dental prosthesis blank according to claim 21, wherein the diameter/height ratio is more than 3 to 1.

23. The dental prosthesis blank according to claim 1,
wherein the gum-colored material (14) and the tooth-colored material (12) are fabricated of a plastic material, and
wherein the average inclination of the boundary (16) is 20 degrees to 25 degrees or more.

* * * * *